(12) United States Patent
Gou et al.

(10) Patent No.: US 8,780,780 B2
(45) Date of Patent: Jul. 15, 2014

(54) METHOD AND BASE STATION FOR TRANSMITTING BROADCAST MULTICAST SERVICE CONTROL SIGNALING

(75) Inventors: Wei Gou, Shenzhen (CN); Zijiang Ma, Shenzhen (CN); Bin Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 192 days.

(21) Appl. No.: 13/148,266

(22) PCT Filed: Jan. 14, 2010

(86) PCT No.: PCT/CN2010/070192
§ 371 (c)(1),
(2), (4) Date: Aug. 5, 2011

(87) PCT Pub. No.: WO2010/091605
PCT Pub. Date: Aug. 19, 2010

(65) Prior Publication Data
US 2011/0292861 A1    Dec. 1, 2011

(30) Foreign Application Priority Data

Feb. 11, 2009    (CN) .......................... 2009 1 0007613

(51) Int. Cl.
*H04W 4/06*    (2009.01)
*H04W 76/00*    (2009.01)
*H04L 12/18*    (2006.01)
*H04W 72/00*    (2009.01)

(52) U.S. Cl.
CPC .......... *H04W 76/002* (2013.01); *H04L 12/185* (2013.01); *H04W 72/005* (2013.01)
USPC ........................................ 370/312

(58) Field of Classification Search
CPC . H04W 76/006; H04W 72/005; H04L 12/185
USPC ................... 370/312, 315, 328–332
See application file for complete search history.

(56) References Cited

U.S. PATENT DOCUMENTS 8,000,292 B2 * 8/2011 Cai et al. .................... 370/329
2010/0272004 A1 * 10/2010 Maeda et al. ............... 370/312

FOREIGN PATENT DOCUMENTS

CN        101299828 A    11/2008
WO    WO 2008/114883 A1    9/2008

OTHER PUBLICATIONS

3GPP TSG-RAN WG2, MCCH Hierarchy and Transmission Modes, Aug. 20-24, 2007, Nokia Siemens Networks, #59, Agenda Item 4.7.1, R2-073082, # of pp. 5.*

(Continued)

*Primary Examiner* — Jae Y Lee
*Assistant Examiner* — Jean F Voltaire
(74) *Attorney, Agent, or Firm* — DASCENZO Intellectual Property Law, P.C.

(57) ABSTRACT

The present invention provides a method and base station for transmitting broadcast multicast service control signaling, and the method includes: a serving base station of a cell located in overlapped coverage of more than one Multimedia Broadcast multicast service Single Frequency Network (MBSFN) area respectively determining multi-cell mode broadcast multicast service control signaling for each MBSFN area, and transmitting the determined multi-cell mode broadcast multicast service control signaling. The base station serves a cell located in overlapped coverage of more than one MBSFN area, and includes a control signaling determination module and a control signaling transmission module. The method and base station of the present invention avoid the complex processing at the border of MBSFN areas, and facilitates the management of control signaling in MBSFN areas.

7 Claims, 2 Drawing Sheets

(56) References Cited

OTHER PUBLICATIONS

3GPP TSG-RAN WG2, Multiple+ing of MBSFN subframes, Jan. 14-18, 2008, Philips, #60bis, Agenda Item 4.6.1.1, Tdoc R2-080302, # of pp. 5.*
3GPP TSG-RAN, MCCH Hierarchy and Transmission Modes, Nokia Siemens Networks, Nokia, Aug. 24, 2007.*
3GPP TSG-RAN, Multiplexing of MBSFN subframes, Philips, Jan. 18, 2008.*
3GPP TSG-RAN WG2, MCCH Hierarchy and Transmission Modes, Aug. 24, 2007, Nokia Siemens Networks, Nokia, # pp. 5.*
3GPP TSG, Multiplexing of MBSFN subframes, Jan. 18, 2008, Philips, # pp. 5.*
Nokia Siemens Networks, Nokia, "MCCH Hierarchy and Transmission Modes," 3GPP TSG-RAN WG2 Meeting #59, Athens, Greece, Aug. 20-24, 2007.
Philips, "MCCH structure and multiplexing," 3GPP TSG-RAN WG2#59bis, Shanghai, China, Oct. 8-12, 2007.
Philips, "Multiplexing of MBSFN subframes," 3GPP TSG-RAN WG2#60bis, Sevilla, Spain, Jan. 14-18, 2008.

* cited by examiner

METHOD AND BASE STATION FOR TRANSMITTING BROADCAST MULTICAST SERVICE CONTROL SIGNALING

TECHNICAL FIELD

The present invention relates to the Long Term Evolution (LTE) system, and particularly, to a method and base station for transmitting Multimedia Broadcast Multicast Service (MBMS) control signaling when Multimedia Broadcast multicast service Single Frequency Network (MBSFN) areas are overlapped.

BACKGROUND OF THE INVENTION

With the rapid development of the Internet and the popularization of large screen multi-function mobile phones, a large quantity of mobile data multimedia services and various broad bandwidth multimedia services, such as the video conference, TV broadcast, video on demand, video advertisement, online education, and interactive games, etc., have emerged, which not only satisfy the continuously increasing service demands of mobile users, but also bring new service increasing points for mobile operators. These mobile data multimedia services requires that multiple users can receive the same data at the same time, and compared with general data services, they have characteristics such as large data amount, long duration, and delay sensitivity etc. For the purpose of efficiently utilizing mobile network resources, the 3rd Generation Partnership Project (3GPP) puts forward the MBMS service, which is a technique for transmitting data from one data source to multiple destinations, and which implements sharing of network (including the core network and access network) resources, and increases the utilization ratio of network resources (especially the air interface resources). The MBMS service defined in the 3GPP not only can implement multicast and broadcast of pure text and low speed messages, but also can implement broadcast and multicast of high speed multimedia services, and provides various abundant video, audio and multimedia services, which undoubtedly complies with the developing trend of future mobile data, and provides a better service prospect for the development of the 3rd Generation (3G).

In the LTE system, transmission of the MBMS service on the air interface is classified into two modes: the dedicated carrier and the mixed carrier, and a significant difference between these two transmission modes lies in that in the dedicated carrier mode, the carrier only carries the MBMS service; while in the mixed carrier mode, the carrier not only carries the MBMS service, but also carries the non MBMS service (e.g., the unicast service). As such, in the process of carrying the MBMS service in the mixed carrier mode, there may be the situation that two types of services are multiplexed on the same carrier. In order that these two types of services do not interfere with each other and have the maximum efficiency during transmission of the services, in the process of carrying the MBMS service and non MBMS service by using a mixed carrier in the LTE, the two types of services apply Time-Division Multiplexing (TDM).

In a MBSFN area, certain physical resources are allocated by a MBMS resource configuration method to carry the MBMS service in the MBSFN area. As shown in FIG. 1, the subframes filled with oblique lines denote the resources allocated to the MBMS service in a certain MBSFN area by using the existing MBMS service resource allocation scheme.

In a LTE system, MBSFN areas are allowed to overlap the same geographical location, the service contents in the MBSFN areas are different, and the physical resources for carrying the MBMS service allocated to the MBSFN areas are different. The physical channel formed by the physical resources for transmitting the MBMS service in each MBSFN area is called Physical Multicast Channel (PMCH), which is used to carry a Multicast Channel (MCH). As shown in FIG. 2, there are 2 MBSFN areas (the bold border line represents the area border) in all, namely MBSFN area ID1 and MBSFN area ID2 (respectively referred to as MBSFN ID1 and MBSFN ID2 for short in this disclosure). The coverage area of MBSFN ID1 includes the area of MBSFN ID2, that is, the overlapped coverage area of MBSFN ID1 and MBSFN ID2 is the area of MBSFN ID2. For the cells in the area of MBSFN ID2, there are 2 overlapped MBSFN areas. According to the existing MBMS resource allocation scheme, resource allocation as shown in FIG. 3 can be provided. The subframes filled with left oblique lines denote the physical resources allocated to MBSFN ID1, and the subframes filled with right oblique lines denote the physical resources allocated to MBSFN ID2, that is, different physical resources are allocated to different MBSFN areas to ensure that the physical resources in the areas are not overlapped. As such, conflict of data from different MBSFN areas can be avoided, which is one of the objects of the existing scheme design.

In the LTE (also called 3GPP Release 8), the design of the Multicast Control Channel (MCCH) is preliminarily divided into a Primary Multicast Control Channel (P-MCCH) for carrying the Primary Multicast Control Channel signaling; and a Secondary Multicast Control Channel (S-MCCH) for carrying the Secondary Multicast Control Channel signaling. In this disclosure, without further explanation, the MCCH channel is used to carry MBMS control signaling, and therefore, the MCCH represents the MBMS control signaling carried on the MCCH. The scheduling information of one or two P-MCCHs is indicated in a Broadcast Control Channel (BCCH). One is single-cell mode transmission and is transmitted on a Downlink Shared Channel (DL-SCH), and the other is multi-cell mode transmission and is transmitted on the MCH. It should be noted that the concepts of single-cell mode transmission and multi-cell mode transmission in this patent application come from the definitions in chapter 15.3.2 Single-cell transmission and chapter 15.3.3 Multi-cell transmission in the LTE protocol 36.300v870.

In the single-cell mode transmission, each cell transmits MCCH information independently, the MCCH is mapped to the Downlink Shared Channel (DL-SCH) to be carried, and MCCHs of adjacent cells do not perform MBSFN combination; while in the multi-cell mode transmission, the MCCH is mapped to the MCH, each cell in the MBSFN area transmits MCCH information of the same content on the same time and frequency resources simultaneously, and the MCCHs of adjacent cells perform MBSFN combination. The P-MCCH in multi-cell mode transmission is similar.

If the MCCH is not divided into the primary and secondary ones, then both of the Primary Multicast Control Channel signaling and the Secondary Multicast Control Channel signaling are carried on the MCCH.

In a MBSFN area, it is required that the cells in the same MBSFN area transmit data of the same format and content on the same time and frequency resources, namely implementing the MBSFN combination, so as to improve the receiving performance of the terminal, eliminate the hand-off operation of the terminal when the terminal moves in the MBSFN area, and greatly reduce the overhead of signaling. As shown in FIG. 2, when MBSFN areas (such as the MBSFN ID1 and MBSFN ID2) are overlapped, the prior art does not give an operable method regarding how to form the broadcast and multicast service control signaling, how to transmit the broadcast and multicast service control signaling, and ensure that the control signaling belonging to the areas of MBSFN ID1 and MBSFN ID2 can also perforin the MBSFN combination at the border of the overlapped area to realize that the control signaling can perform the MBSFN combination in all the valid areas, and ensure the effectiveness of control signaling transmission, that is, the control signaling is not transmitted when there is no MBMS service.

SUMMARY OF THE INVENTION

The technical problem to be solved in the present invention is to provide a method and base station for transmitting broadcast multicast service control signaling to accomplish the largest area MBSFN combination of the control signaling.

Drawbacks of the prior art are researched. Taking FIG. 2 as an example, MBSFN ID1 and MBSFN ID2 overlap the area of MBSFN ID2. Assuming that the MBMS service physical resources allocated to the MBSFN ID1 area and the MBSFN ID2 area correspond to only one MCH transmission channel respectively, which are denoted as MCH1 transmission channel and MCH2 transmission channel, a cell in the MBSFN ID2 area can select one of the two MCH transmission channels to transmit the broadcast multicast service control signaling. Assuming that the multi-cell mode transmission control signaling of the MBSFN area is the signaling carried on the P-MCCH (may also be the multi-cell mode transmission MCCH that is not divided into the primary and secondary ones, and herein the multi-cell mode transmission P-MCCH is taken as an example), the multi-cell mode transmission control signaling of MBSFN ID1 and MBSFN ID2 is denoted as P-MCCH1 signaling and P-MCCH2 signaling respectively. However, in the cell within the overlapped area, according to the prior art, only one piece of multi-cell mode transmission broadcast multicast service control signaling is determined, then the control signaling carries both the P-MCCH1 signaling and the P-MCCH2 signaling, and when the cell transmits the multi-cell mode control signaling, there are three situations as follows:

(1) if the cell within the overlapped area transmits the multi-cell mode transmission control signaling H-PMCCH (herein, for convenience of description, the signaling including both the P-MCCH1 and the P-MCCH2 is referred to as H-PMCCH) carrying the hybrid of P-MCCH1 signaling and P-MCCH2 signaling on the MCH1 transmission channel only, then the terminal belonging to the MBSFN ID2 area in the cell can obtain the position of MCH1 of the MBSFN ID1 area only after being notified by other signaling, and then can receive the H-PMCCH signaling in the MCH1, and obtain the P-MCCH2 therein; as for the MBSFN ID1 area, the cell belonging to the MBSFN ID 1 area but not belonging to the MBSFN ID2 area transmits the control signaling that only carries the P-MCCH1 signaling on the MCH1 transmission channel, which will cause that the multi-cell mode transmission control signaling of the cells at the two sides of the border of the MBSFN ID1 and MBSFN ID2 overlapped area is unable to accomplish the MBSFN combination, since the cell belonging to MBSFN ID1 but not belonging to MBSFN ID2 at the border only transmits the P-MCCH1 and the cell belonging to MBSFN ID2 at the border transmits the H-PM-CCH, and the difference in the content of the transmission data causes that the MBSFN combination is unable to be accomplished.

(2) if the cell within the overlapped area transmits the multi-cell mode transmission control signaling H-PMCCH carrying the hybrid of P-MCCH1 signaling and P-MCCH2 signaling on the MCH2 transmission channel only, then the terminal belonging to the MBSFN ID1 area in the cell can obtain the position of MCH2 of the MBSFN ID2 area only after being notified by other signaling, and then can receive the H-PMCCH signaling in the MCH2, and obtain the P-MCCH1 therein; in the meantime, the cell in the area belonging to MBSFN ID1 but not belonging to MBSFN ID2 transmits the P-MCCH1 signaling on MCH1, then at the border of the overlapped area of MBSFN ID1 and MBSFN ID2, the P-MCCH1 signaling and the H-PMCCH signaling are unable to accomplish the MBSFN combination, and since the MCH channels of the two are different, respective interference to the adjacent cell at the border will be produced.

(3) if the cell within the overlapped area transmits the multi-cell mode transmission control signaling H-PMCCH carrying the hybrid of P-MCCH1 signaling and P-MCCH2 signaling on both the MCH1 and the MCH2 transmission channels, the largest area combination of the H-PMCCH can be accomplished. However, in this situation, as for the MCH1 of MBSFN ID1, the control signaling of the MBMS service irrelevant to the MBSFN ID1 area is transmitted, and as for the MCH2 of MBSFN ID2, the control signaling of the MBMS service irrelevant to the MBSFN ID2 area is transmitted, which causes a waste of the resources for transmitting control signaling.

Besides the overlapped situation of an including and being included relationship of the MBSFN ID1 area and MBSFN ID2 area shown in FIG. 2 (i.e., the MBSFN ID1 area includes the MBSFN ID2 area completely), there is also an overlapped situation of two areas intersecting (i.e., a MBSFN area only includes a part of another MBSFN area), and at the border of the two MBSFN areas, the problem that the multi-cell mode transmission broadcast multicast service control signaling is unable to accomplish the MBSFN combination also exists.

In order to solve the above problem, under the condition of multiple overlapped MBSFN areas, the overlapped area should not be configured with only one piece of multi-cell mode transmission MBMS control signaling. Based on the above analysis, the present invention presents the following solutions.

In order to solve the above problem, the present invention provides a method for transmitting broadcast multicast service control signaling under overlapped coverage of multicast areas, comprising:

a serving base station of a cell located in overlapped coverage of more than one Multimedia Broadcast multicast service Single Frequency Network (MBSFN) area respectively determining multi-cell mode broadcast multicast service control signaling for each MBSFN area, and then transmitting the signaling.

The above method may also have the following feature: said base station respectively transmitting the multi-cell mode broadcast multicast service control signaling of each MBSFN area on a multicast channel corresponding to broadcast multicast physical resources of that MBSFN area.

The above method may also have the following feature: the multi-cell mode broadcast multicast service control signaling of each MBSFN area at least including multi-cell mode primary multicast control channel signaling of that MBSFN area.

The above method may also have the following feature: the primary multicast control channel signaling of the multi-cell mode broadcast multicast service of each MBSFN area only including control signaling carried on a primary multicast control channel in that MBSFN area, but not including control signaling carried on the primary multicast control channel in other MBSFN areas.

The above method may also have the following feature: each MBSFN area corresponding to one piece of multi-cell mode primary multicast control channel signaling.

The above method may also have the following feature: the multi-cell mode broadcast multicast service control signaling of each MBSFN area at least including multi-cell mode multicast control channel signaling of that MBSFN area.

The above method may also have the following feature: the multi-cell mode multicast control channel signaling of each MBSFN area only including control signaling carried on a multicast control channel in that MBSFN area, but not including control signaling carried on the multicast control channel in other MBSFN areas.

The above method may also have the following feature: before determining the multi-cell mode broadcast multicast service control signaling, a related functional entity in a system separately configuring the multi-cell mode broadcast multicast service control signaling for each MBSFN area of the cell located in the overlapped coverage of MBSFN areas respectively.

In the above method, the step of separately configuring the multi-cell mode broadcast multicast service control signaling for each MBSFN area respectively comprises:

said base station determining a transmission position of the multi-cell mode broadcast multicast service control signaling of each MBSFN area according to a transmission period, a radio frame offset, a modification period, subframe information and a modulation coding scheme of the multi-cell mode broadcast multicast service control signaling configured for that MBSFN area by the related functional entity in the system; and forming multi-cell mode transmission broadcast multicast service control signaling of each MBSFN area according to MBMS session start signaling, MBMS session stop signaling and MBMS scheduling information signaling transmitted by the related functional entity in the system.

In order to solve the above problem, the present invention further provides a base station, wherein a cell served by said base station is the cell located in overlapped coverage of more than one Multimedia Broadcast multicast service Single Frequency Network (MBSFN) area, and said base station comprises a control signaling determination module and a control signaling transmission module, wherein said control signaling determination module is configured to respectively determine multi-cell mode broadcast multicast service control signaling for each MBSFN area, and notifying said control signaling transmission module;

said control signaling transmission module is configured to transmit the multi-cell mode broadcast multicast service control signaling of each MBSFN area on a multicast channel corresponding to broadcast multicast physical resources of that MBSFN area.

The above base station may also have the following feature: said multimedia broadcast multicast service control signaling of the MBSFN area at least including multi-cell mode primary multicast control channel signaling of the MBSFN area, and the multi-cell mode primary multicast control channel signaling of each MBSFN area only including control signaling carried on a primary multicast control channel in that MBSFN area, but not including control signaling carried on the primary multicast control channel in other MBSFN areas.

The above base station may also have the following feature: said multi-cell mode broadcast multicast service control signaling of each MBSFN area at least including multi-cell mode multicast control channel signaling of that MBSFN area, and the multi-cell mode multicast control channel signaling of each MBSFN area only including control signaling carried on a multicast control channel in that MBSFN area, but not including control signaling carried on the multicast control channel in other MBSFN areas.

The method of the present invention can implement transmission of the multi-cell mode control signaling of the MBMS service of each cell in overlapped coverage area of multicast areas, and can implement the largest valid area MBSFN combination of the multi-cell mode control signaling of each MBSFN area, and realizes effective transmission of control signaling, and avoids the complex processing at the border of the MBSFN areas, which facilitates the management of control signaling in the MBSFN areas.

PREFERRED EMBODIMENTS OF THE PRESENT INVENTION

Figure 1:
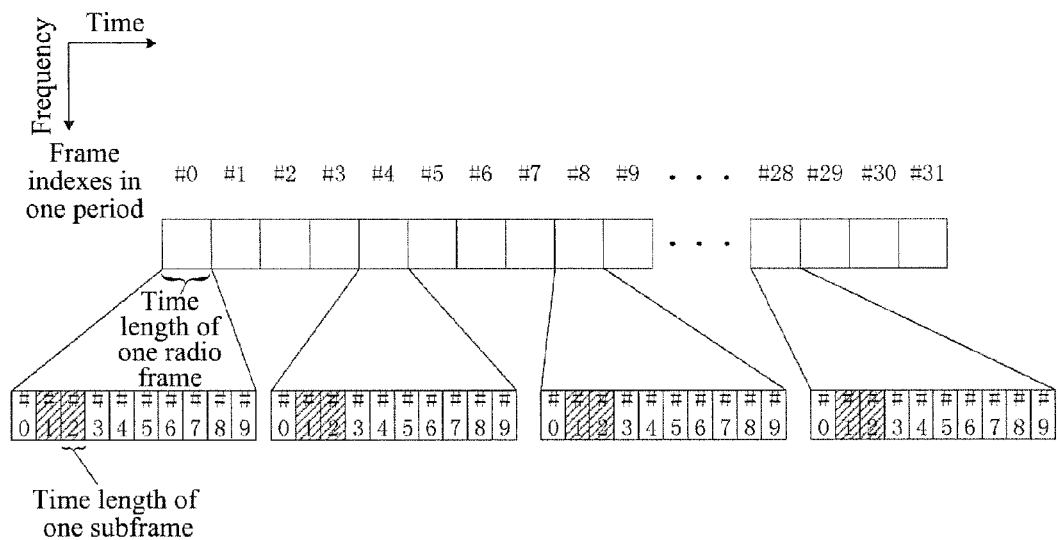
FIG. 1 is a schematic diagram of a scheme for allocating multicast resources to a MBSFN area in the prior art.

When there are MBSFN areas overlapped, a cell in the overlapped area of the MBSFN areas belongs to a plurality of MBSFN areas at the same time, and the multi-cell mode MBMS service control signaling of each MBSFN area should be transmitted independently.

In the present invention, the multi-cell mode broadcast multicast service control signaling of each MBSFN area is respectively determined for the cells located in the overlapped coverage of more than one Multimedia Broadcast multicast service Single Frequency Network (MBSFN) area, and is transmitted in the multicast channel corresponding to the MBMS physical resources of each area, which can implement the largest area MBSFN combination of the control signaling of each area in the areas. In other words, in a cell overlapped by N MBSFN areas, it is required to determine one piece of multi-cell mode broadcast multicast service control signaling respectively for each of the N MBSFN areas, and to transmit the respective multi-cell mode broadcast multicast service control signaling on the respective MCH of each of the N MBSFN areas respectively.

The following relationship exists among the MBSFN area, the multi-cell mode MBMS service control signaling and the MCH channel corresponding to the physical resources of the MBSFN area: the multi-cell mode MBMS service control signaling of each MBSFN area only includes the control signaling carried on the MBMS service control channel specified in the protocol of that MBSFN area, but does not include the control signaling carried on the MBMS service control channel specified in the protocol of other MBSFN areas; the multi-cell mode MBMS service control signaling belonging to a MBSFN area should be carried on the MCH channel corresponding to the physical resources of the MBSFN area.

The multi-cell mode MBMS service control signaling of a MBSFN area at least includes the multi-cell mode Primary Multicast Control Channel (P-MCCH) signaling of the MBSFN area. In practical application, the system can define which relative control signaling should be included in the multi-cell mode Primary Multicast Control Channel signaling of a particular MBSFN area. Each MBSFN area includes one piece of multi-cell mode Primary Multicast Control Channel (P-MCCH) signaling.

In this embodiment, a cell is served by one base station, and one base station serves one cell only, namely the one to one correspondence, for convenience of description. The cell served by the base station is a cell located in the overlapped coverage of more than one Multimedia Broadcast multicast service Single Frequency Network (MBSFN) area, and the base station includes a control signaling determination module and a control signaling transmission module.

The control signaling determination module is for determining the multi-cell mode broadcast multicast service control signaling of each MBSFN area, wherein the multi-cell mode broadcast multicast service control signaling of a MBSFN area at least includes the multi-cell mode P-MCCH of the MBSFN area. The multi-cell mode P-MCCH of each MBSFN area only includes the control signaling carried on the P-MCCH specified in the protocol of that MBSFN area, but does not include the control signaling carried on the P-MCCH specified in the protocol of other MBSFN areas; when the MCCH is not divided into the primary and secondary ones, similarly, the multi-cell mode MBMS control signaling at least includes the MCCH signaling of the MBSFN area, and the multi-cell mode MCCH signaling of a MBSFN area only includes the control signaling carried on the MCCH specified in the protocol of the MBSFN area, but does not include the control signaling generally on the MCCH specified in the protocol of other MBSFN areas.

The determination of the multi-cell mode broadcast multicast service control signaling of each MBSFN area specifically includes: the base station determining the transmission position of the multi-cell mode broadcast multicast service control signaling of each MBSFN area according to the transmission period, radio frame offset, modification period, subframe information, and Modulation Coding Scheme (MCS) of the multi-cell mode broadcast multicast service control signaling configured for the MBSFN area by the Multi-cell/multicast Coordination Entity (MCE), and then forming the multi-cell mode transmission broadcast multicast service control signaling corresponding to each MBSFN area according to MBMS Session Start signaling, MBMS Session Stop signaling and MBMS Scheduling Information signaling transmitted by the MCE.

The control signaling transmission module is for transmitting the multi-cell mode broadcast multicast service control signaling of each MBSFN area on the multicast channel corresponding to the broadcast multicast physical resources of the MBSFN area.

Figure 4:
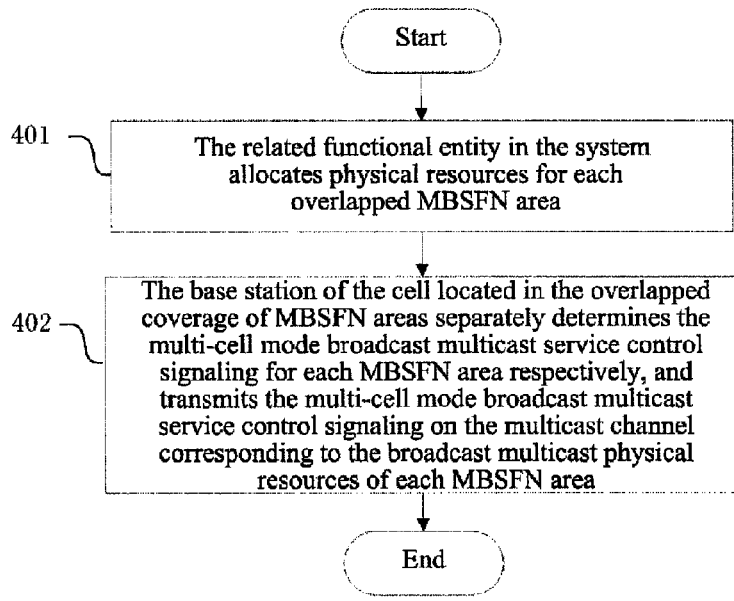
FIG. 4 is a flow chart of the method for transmitting broadcast multicast service control signaling under overlapped coverage of multicast areas according to the present invention.

As shown in FIG. 4, a method for transmitting broadcast multicast service control signaling under overlapped coverage of multicast areas includes steps as follows:

Step 401, a related functional entity in the system allocates physical resources for each overlapped MBSFN area, namely separately configuring multi-cell mode broadcast multicast service control signaling for each MBSFN area of the cell located in the overlapped coverage of the MBSFN areas respectively.

The division of physical resources can use the method currently used by the LTE. Taking the MBSFN ID1 area and MBSFN ID2 area in FIG. 2 as an example, different physical resources as shown in FIG. 3 can be respectively allocated to these two areas.

The physical resources for carrying the MBMS service are called actual physical resources of the MBSFN area. In this embodiment, the MBMS physical resources of one MBSFN area are not divided into a plurality of parts of which each corresponds to one MCH transmission channel, but all the MBMS physical resources of one MBSFN area correspond to one MCH transmission channel only, and both the MBMS service control signaling and the MBMS service data signaling of the MBSFN area are transmitted on the MCH. As such, when a cell located in the overlapped coverage of more than one MBSFN area transmits the multi-cell mode broadcast multicast service control signaling of a particular MBSNF area, it does not need to make a selection from a plurality of MCH transmission channels, which can simplify the processing flow. Of course, in other embodiments, the MBMS physical resources of each MBSFN area can correspond to more than one MCH transmission channel.

The related functional entity in the system is a MCE.

Step 402, the base station of the cell located in the overlapped coverage of MBSFN areas separately determines the multi-cell mode broadcast multicast service control signaling for each MBSFN area respectively, and transmits the multi-cell mode broadcast multicast service control signaling on the multicast channel corresponding to the broadcast multicast physical resources of each MBSFN area, and the flow ends.

The base station separately determining multi-cell mode broadcast multicast service control signaling for each MBSFN area respectively specifically includes: the base station determining the transmission position of the multi-cell mode broadcast multicast service control signaling of each MBSFN area according to the transmission period, radio frame offset, modification period, subframe information, and Modulation Coding Scheme (MCS) of the multi-cell mode broadcast multicast service control signaling configured for the MBSFN area by the MCE; and then forming the multi-cell mode transmission broadcast multicast service control signaling corresponding to each MBSFN area according to the MBMS Session Start signaling, MBMS Session Stop signaling and MBMS Scheduling Information signaling transmitted by the MCE. The multi-cell mode MBMS service control signaling only includes the control signaling of the MBSFN area, the multi-cell mode MBMS control signaling of a MBSFN area at least includes the multi-cell mode Primary Multicast Control Channel (P-MCCH) signaling of the MBSFN area, and the multi-cell mode MBMS service P-MCCH of a MBSFN area only includes the control signaling carried on the P-MCCH specified in the protocol of the MBSFN area, but does not include the control signaling carried on the P-MCCH specified in the protocol of other MBSFN areas. When the MCCH is not divided into the primary and secondary ones, similarly, the multi-cell mode MBMS control signaling at least includes the MCCH signaling of the MBSFN area, and the multi-cell mode MCCH signaling of a MBSFN area only includes the control signaling carried on the MCCH specified in the protocol of the MBSFN area, but does not include the control signaling generally on the MCCH specified in the protocol of other MBSFN areas.

The above method can implement transmission of the multi-cell mode control signaling of the MBMS service of each cell in the overlapped coverage area of multicast areas, and can implement the largest valid area MBSFN combination of the multi-cell mode control signaling of each MBSFN area, and realizes effective transmission of control signaling, and avoids the complex processing at the border of the MBSFN areas, which facilitates the management of control signaling in the MBSFN areas.

Figure 2:
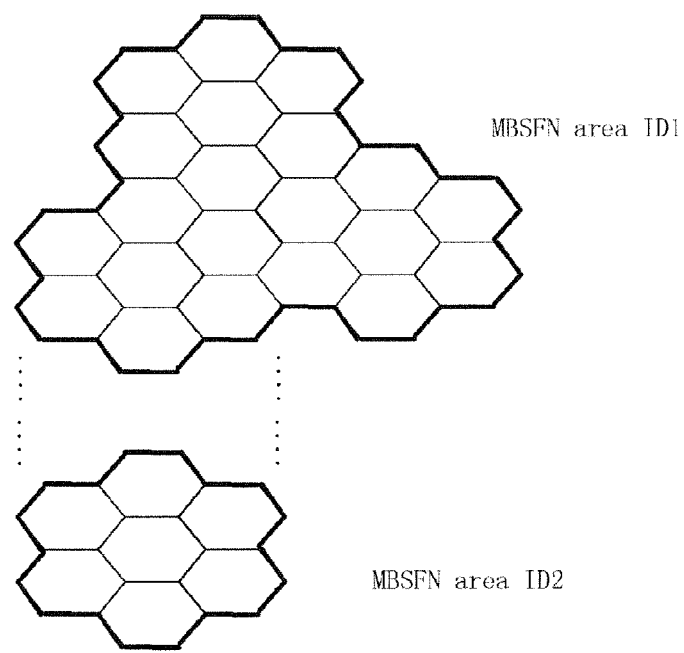
FIG. 2 is a schematic diagram of overlapped MBSFN areas in the prior art.
Figure 3:
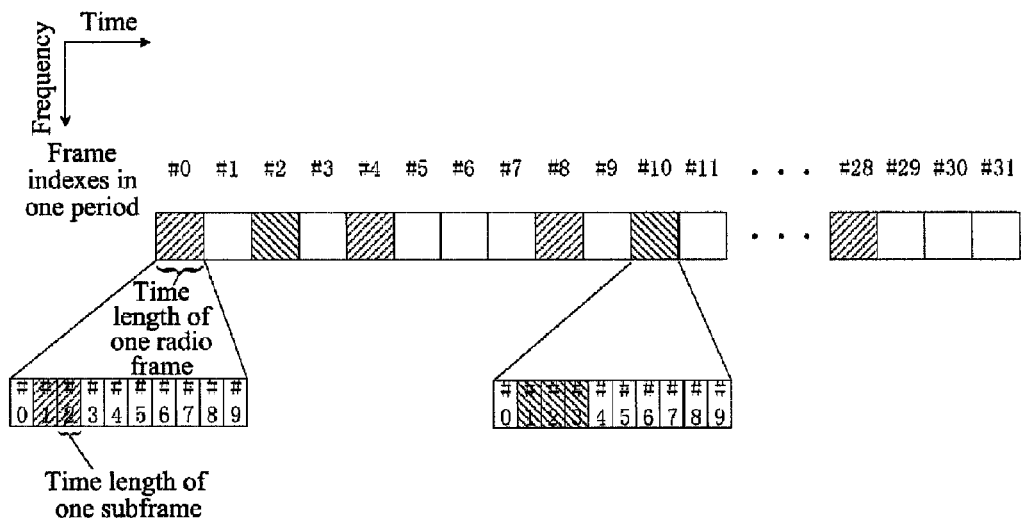
FIG. 3 is a schematic diagram of allocating multicast resources to two MBSFN areas when these two MBSFN areas are overlapped in the prior art.

In an application instance, taking the multi-cell mode P-MCCH as an example for the multi-cell mode MBMS service control signaling, as for the overlapped MBSFN ID1 and MBSFN ID2 shown in FIG. 2, the cell in the MBSFN ID1 area determines the Primary Multicast Control Channel signaling of the MBSFN ID1 area, which is denoted as P-MCCH1 signaling, and this control signaling only includes the information related to the MBSFN ID1 area, but does not include the information of the MBSFN ID2 area; the cell in the MBSFN ID2 area determines the Primary Multicast Control Channel signaling belonging to the MBSFN ID2 area, which is denoted as P-MCCH2 signaling, and this control signaling only includes the information related to the MBSFN ID2 area, but does not include the information of the MBSFN ID1 area; the cell in the MBSFN ID1 area transmits the P-MCCH1 signaling on the MCH corresponding to the physical resources of MBSFN ID1, and transmits the P-MCCH2 signaling on the MCH corresponding to the physical resources of MBSFN ID2.

When the MCCH is not divided into primary and secondary ones, the processing for the MCCH of multi-cell mode transmission is identical to the above processing for the P-MCCH of multi-cell mode transmission. That is, any MBMS control signaling of multi-cell mode transmission can apply the above processing.

Of course, the above is just a particular implementation of the present invention, and the present invention is not limited to the above particular method. Without departing from the spirit and essence of the present invention, a person skilled in the art can make various corresponding modifications and variations according to the present invention, but all these corresponding modifications and variations shall fall into the protection scope of the appended claims of the present invention.

INDUSTRIAL APPLICABILITY

Compared with the prior art, the present invention can implement transmission of the multi-cell mode control signaling of the MBMS service of each cell in overlapped coverage area of multicast areas, and can implement the largest valid area MBSFN combination of the multi-cell mode control signaling of each MBSFN area, and realizes effective transmission of control signaling, and avoids the complex processing at the border of the MBSFN areas, which facilitates the management of control signaling in the MBSFN areas.

What is claimed is:

1. A method for transmitting broadcast multicast service control signaling, comprising:
a serving base station of a cell located in overlapped coverage of more than one Multimedia Broadcast multicast service Single Frequency Network (MBSFN) areas determining respective multi-cell mode broadcast multicast service control signalings for the MBSFN areas, and the serving base station transmitting the multi-cell mode broadcast multicast service control signalings for each MBSFN area on a multicast control channel of this MBSFN area, wherein the multicast control channel is mapped to a multicast channel carried on broadcast multicast physical resources of this MBSFN area;
wherein the multi-cell mode broadcast multicast service control signaling of each MBSFN area at least includes multi-cell mode multicast control channel signaling of the MBSFN area; and
wherein the multi-cell mode multicast control channel signaling of each MBSFN area only includes control signaling carried on a multicast control channel in the MBSFN area, but does not include control signaling carried on the multicast control channel in other MBSFN areas.

2. The method as claimed in claim 1, wherein
the multi-cell mode multicast control channel signaling is multi-cell mode primary multicast control channel signaling; and
the multicast control channel is the primary multicast control channel.

3. The method as claimed in claim 2, wherein each MBSFN area corresponds to one piece of multi-cell mode primary multicast control channel signaling.

4. The method as claimed in claim 1, before the step of determining the multi-cell mode broadcast multicast service control signaling, the method further comprising:
a related functional entity in a system separately configuring the multi-cell mode broadcast multicast service control signaling for each MBSFN area of the cell located in the overlapped coverage of MBSFN areas respectively.

5. The method as claimed in claim 4, wherein the step of determining the multi-cell mode broadcast multicast service control signaling for each MBSFN area comprises:
said base station determining a transmission position of the multi-cell mode broadcast multicast service control signaling of each MBSFN area according to a transmission period, a radio frame offset, a modification period, sub-frame information and a modulation coding scheme of the multi-cell mode broadcast multicast service control signaling configured for that MBSFN area by the related functional entity in the system; and
forming multi-cell mode transmission broadcast multicast service control signaling of each MBSFN area according to MBMS session start signaling, MBMS session stop signaling and MBMS scheduling information signaling transmitted by the related functional entity in the system.

6. A base station, a cell served by said base station being the cell located in overlapped coverage of more than one Multimedia Broadcast multicast service Single Frequency Network (MBSFN) areas, and said base station comprising at least one processor executing a control signaling determination module and a control signaling transmission module, wherein
said control signaling determination module is configured to determine respective multi-cell mode broadcast multicast service control signalings for the MBSFN areas, and notifying said control signaling transmission module;
said control signaling transmission module is configured to transmit the multi-cell mode broadcast multicast service control signalings for each MBSFN area on a multicast control channel of this MBSFN area, wherein the multicast control channel is mapped to a multicast channel carried on broadcast multicast physical resources of this MBSFN area; and
said multi-cell mode broadcast multicast service control signaling of each MBSFN area at least includes multi-cell mode multicast control channel signaling of this MBSFN area, and the multi-cell mode multicast control channel signaling of each MBSFN area only includes control signaling carried on a multicast control channel in this MBSFN area, but does not include control signaling carried on the multicast control channel in other MBSFN areas.

7. The base station as claimed in claim 6, wherein
the multi-cell mode multicast control channel signaling is multi-cell mode primary multicast control channel signaling; and
the multicast control channel is the primary multicast control channel.

* * * * *